United States Patent [19]

Kaminskas

[11] 3,818,221

[45] June 18, 1974

[54] RADIATION GENERATOR PROVIDING AMPLITUDE MODULATION

[75] Inventor: Rimvydas Kaminskas, Redondo Beach, Calif.

[73] Assignee: The United States of America as represented by the United States Atomic Energy Commission, Washington, D.C.

[22] Filed: Apr. 22, 1971

[21] Appl. No.: 136,344

Related U.S. Application Data

[62] Division of Ser. No. 868,704, Oct. 23, 1969.

[52] U.S. Cl............................. 250/105, 250/106 S
[51] Int. Cl.............................................. G21f 3/00
[58] Field of Search.......... 250/106 S, 84, 84.5, 105

[56] References Cited
UNITED STATES PATENTS
3,430,046   2/1969   Eerkens...................... 250/106 S X Primary Examiner—James W. Lawrence
Assistant Examiner—Davis L. Willis
Attorney, Agent, or Firm—John A. Horan

[57] ABSTRACT

An aircraft landing system based upon two or more beams of nuclear radiation is disclosed. Each beam is shaped by a radiation generator to conform to a desired pattern and is frequency modulated by the generator for identification and comparison purposes. Overlapping of two beams provides a spatial plane to serve as one reference such as a glide slope. A second pair of overlapping beams aligned substantially perpendicular to the first reference provides a second spatial plane to serve as a second reference such as a localizer beam. Appropriate circuitry aboard approaching aircraft is provided to determine the position of the aircraft with respect to the two reference beams.

9 Claims, 11 Drawing Figures

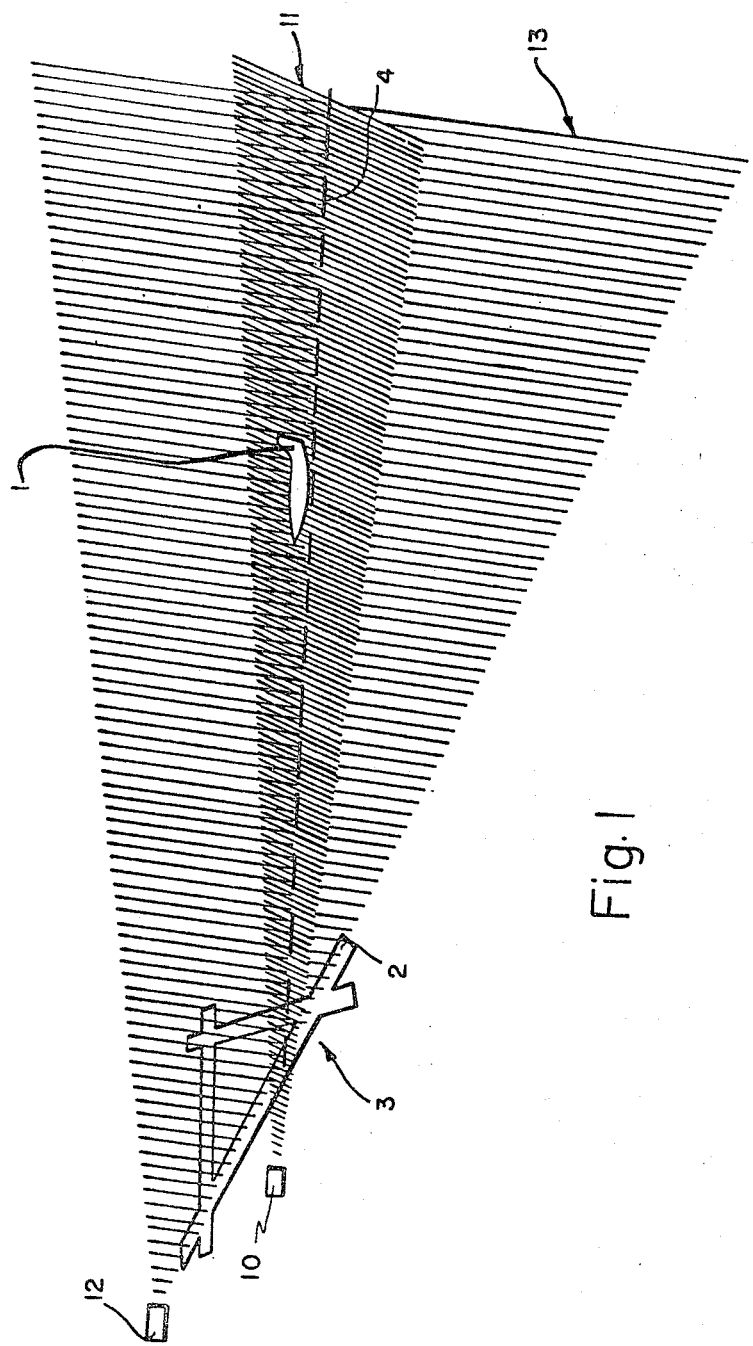

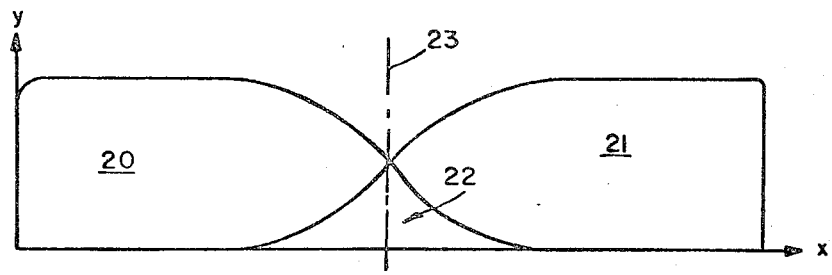
Fig. 3
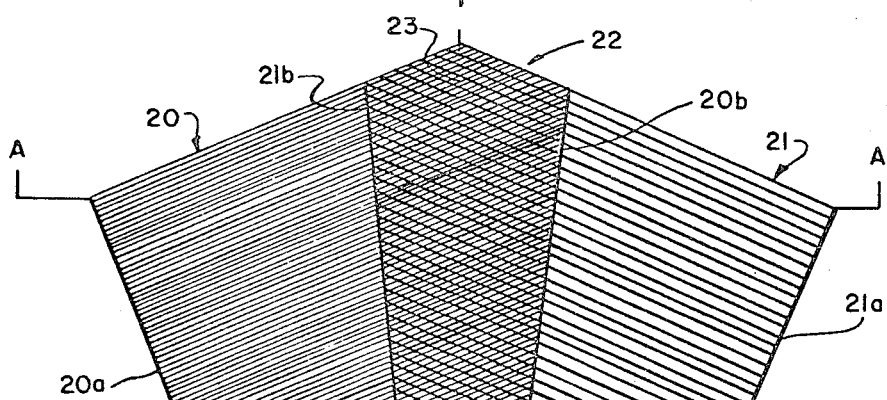
Fig. 2
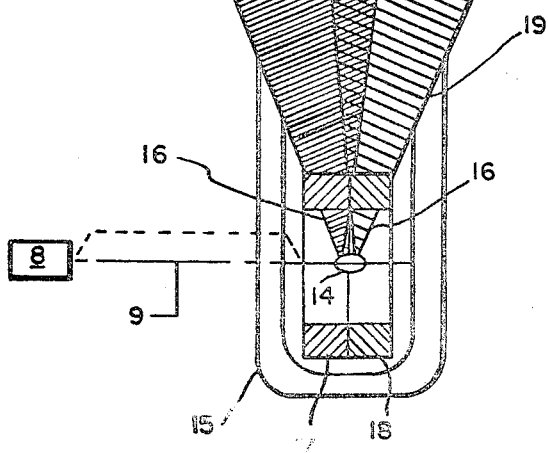

Rimvydas Kaminskas
INVENTOR.

BY William B. Leach
ATTORNEY

RADIATION GENERATOR PROVIDING AMPLITUDE MODULATION

BACKGROUND OF THE INVENTION

This is a division of application Ser. No. 868,704, filed Oct. 23, 1969.

Two aircraft landing systems widely used are known as the instrument landing systems (ILS) and the ground control approach (GCA). The conventional ILS systems contains two separate radio transmitters and arrays of transmitters antennas for the generation of localizer and glide slope radio beams. The localizer beam is a vertical fan of radiation which is used to guide an airplane in the horizontal plane to intercept the end of the runway. The glide slope makes up a horizontal plane of radiation which intersects the ground at the touch down point near the end of the runway and slopes at approximately 2.5° to provide guidance to approaching aircraft in the vertical direction. The intersection of the localizer and the glide slope plane forms a line in space which leads the approaching airplane to the end of the runway. Marker beacons, which are low power vertical fans of radiation, may be used to indicate to the pilot his progress along the approach path. These markers are identified as the outer, middle, and inner marker by different frequencies of modulation. The inner marker is usually located about 250 feet from the runway.

The localizer and glide slope beams each consist of two lobes of radio frequency radiation. One lobe is modulated at 150 HZ and the other modulated at 90 HZ. The intersection of the two lobes forms a plane which, when positioned horizontally, is used as the glide slope, and when positioned vertically is used as the localizer.

The localizer and glide slop signals are received in the aircraft by means of several antennas and receivers. Each receiver output actuates a common instrument having two indicator needles which indicate to the pilot his position with respect to the two reference beams. The aircraft is directly on the approach course when the two needles cross in the center of the instrument indicating that equal amounts of 90 and 150 cycle signals are being received from the localizer and glide slope receivers.

The presently used landing systems do an excellant job of guiding an airplane from a distance of many miles to the inner marker. However, from the inner marker, a few hundred feet from the end of the runway, the pilot is on his own and has to make the landing visually. The necessity of making a visual landing during the last few hundred feet is required because the radio beams of the instrument landing system interfere and reflect from the ground and other objects around the runway. This interference will, of course, cause a deterioration in the accuracy of the system just at the time when most precision is required. Also, the presently used landing systems provide a convergent beam that converges to a point at the origin near the landing point thus varying the size of the corridor that the aircraft has to fly in as a fraction of distance from the origin of the beams.

It is accordingly an object of the present invention to provide a radiation generator or beacon for an instrument landing system which is not subject to these and other disadvantages and limitations of the prior art.

It is another object of the present invention to provide a radiation beacon for an instrument landing system which is not significantly affected by weather conditions.

A further object of the present invention is to provide a radiation beacon for an instrument landing system which is highly reliable and reasonable in cost.

It is another object of the present invention to provide a radiation beacon for providing a curved reference path for determining the position of an object relative thereto.

SUMMARY OF THE INVENTION

The present invention provides apparatus for generating one or more patterns of radiation which are intensity modulated for determining the position of an object such as the position of an aircraft with respect to a landing area. The apparatus permits the step of generating a first and second three dimensional pattern of radiation. The patterns are directed so as to overlap and are modulated at predetermined frequencies. The overlapping regions are of changing intensity, thus a spatial plane may be defined which includes equal amounts of radiation from each pattern. A radiation sensing device, in association with the object to be located, may be used to sense the position of the object within the radiation patterns.

Similar apparatus may be used for the generation of a second spatial plane which intersects the first spatial plane. The intersecting spatial planes of radiation define a line in space thereby providing a reference from which to determine the position of an object. The intersecting radiation planes may be shaped by the beacon, for example, generating shapes including hyperbolic, or other arbitrary patterns which provide a line in space or a selected curvature to aid maneauvers such as a flare prior to intersecting with the runway.

The beacon includes a radiation shield in which is provided an aperture. A radiation source is placed within the shield and modulating means permit radiation to emit through the aperture at a predetermined frequency. The shutter and shield may be designed to emit two overlapping radiation patterns and which may be formed to have decreasing intensities within the overlapping regions.

Further, means are provided for defining a flight corridor which has a substantially constant cross-section. This is accomplished in part by the use of a selectively shaped radiation absorber which serves to alter the radiation patterns.

BRIEF DESCRIPTION OF THE DRAWINGS

FIG. 1 is a diagrammatic representation of an example of a position sensing system constructed in accordance with the principles of the present invention;

FIG. 2 is a diagrammatic representation of a radiation beacon in accordance with the principles of the present invention that may be used in the position sensing system of FIG. 1;

FIG. 3 is a graph of the transverse radiation distribution in the radiation pattern of FIG. 2;

DESCRIPTION OF THE PREFERRED EMBODIMENTS

Figure 4:
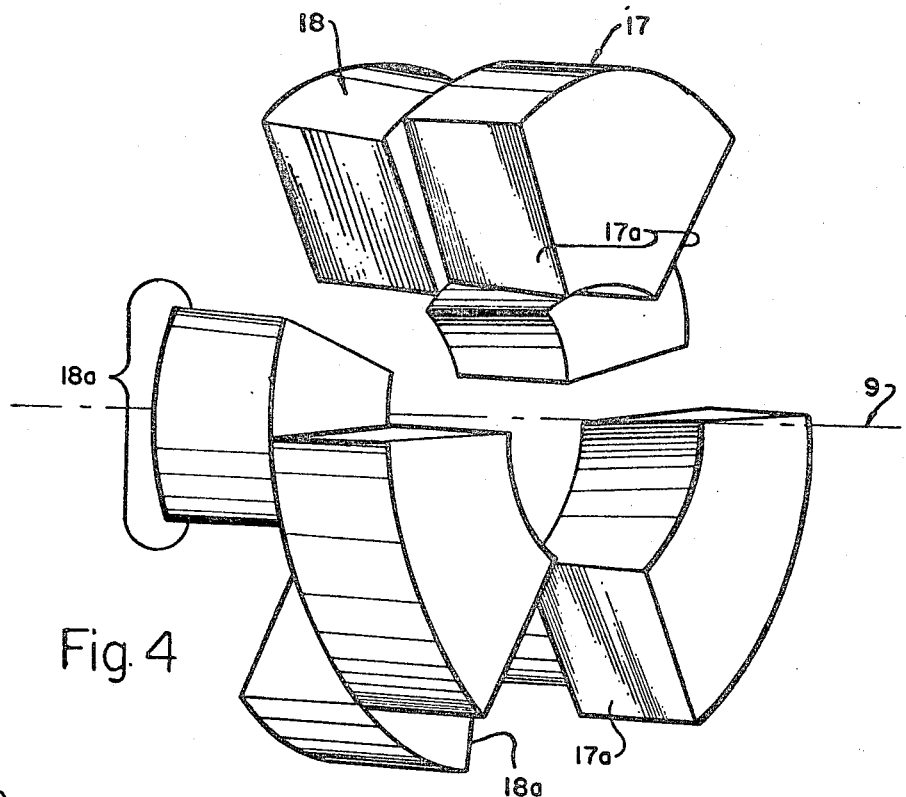
FIG. 4 is a perspective view of a shutter device used in the radiation beacon of FIG. 2.

Referring to FIG. 1, there is depicted an aircraft 1 approaching one runway 2 of airport 3. A first radiation beam or glide slope beacon 10 forms a pattern of radiation which defines a glide slope reference-plane 11. A second radiation beam or localizer beacon 12 forms another pattern of radiation which defines a localizer reference-plane 13. The intersection of the reference planes 11, 13 form a line 4 in space along which the aircraft 1 may be flown to landing. As does an aircraft 1 using a conventional ILS system, the aircraft 1 senses and determines its position with respect to each reference plane of radiation.

In accordance with the principles of the present invention, the reference beams consist of radiation having short wavelengths. A short wavelength herein refers to radiation having a wavelength equal to or shorter than that of visible light. Gamma radiation is particularly suited to the practice of the invention, however, visible light, such as from a laser system, may be used.

The reference plane 11, 13 of FIG. 1 may be produced with the aid of the device shown in FIGS. 2 – 4. A radioisotope source 14 in a housing 15 emits gamma rays 16 which are intermittently passed through a pair of shutters 17, 18. The housing 15 completely encloses the radioactive source 14 and shutters 17, 18 except for an aperture 19 therein. The housing 15 may be of concrete or metal construction and serves to collimate the gamma radiation in a desired direction and to otherwise eliminate radiation in undesired direction.

The shutters 17, 18 are rotated about an axis of revolution 9 by a motor 8. As shown in FIG. 4, the shutters are essentially ring-shaped members or a cylindrical member having radial openings therein 17a, 18a. The shutter 17 is provided with three such radial openings and the shutter 18 is provided with five such radial openings. By way of example, if the shutters 17, 18 are revolved at 3 revolutions per second, the radiation frequency emitted through the one shutter 17 would be $9H_z$ and in the case of the other shutter 18 the radiation frequency would be $15H_z$. The shutter portions 17, 18 may be constructed as an integral unit or as separate units each driven at a particular speed of revolution. Furthermore, the number of radial openings may be varied to provide any desired frequency. Thus, as shown in FIG. 2, the radiation passed through the shutter 17 forms a first pattern of radiation 20 having a first predetermined frequency. The radiation passed through the other shutter forms a second pattern of radiation 21 and has a second predetermined frequency. The two frequencies of radiation are indicated in the drawings by differing the spacing of the lines representative of the radiation patterns.

The shutters 17, 18 and radioisotope source 14 are designed and arranged to direct the two patterns of radiation 20, 21 into a sensitive or an overlapping area 22. The intensity of the radiation is varied transversely within each of the radiation patterns 20, 21. This variance in intensity is depicted graphically in FIG. 3 wherein the Y axis represents radiation intensity and the X axis indicates transverse distance in the radiation pattern taken along section line AA of FIG. 2.

From FIGS. 2 and 3 it may be noted that the first radiation pattern 20 has a greater intensity in the region of its one edge 20a and decreases to a minimum in the region of its other edge 20b. Similarly, the intensity of the radiation in pattern 21 is maximum near its one edge 21a and minimum near its other edge 21b. The overlapping of the two radiation patterns 20, 21 into sensitive area 22 defines a centerplane or zone 23 wherein there is equal amounts of radiation from each pattern.

This center-plane 23 may become a reference plane for sensing the position of an object with respect thereto. If the center-plane 23 of FIGS. 2 and 3 is oriented vertically, it may become the localizer beam 13 of FIG. 1. Similarly, the center-plane 23 may become the glide-slope beam of FIG. 1.

It will be appreciated that to form a center-plane, two patterns of overlapping radiation must be generated and for detection purposes that each pattern of radiation must have a characteristic frequency. It may be noted that the relative amplitude of the two radiation patterns will be approximately the same at any radial position from the source of radiation. A radiation detection system which measures the relative amplitude of the two overlapping radiation patterns and which is located in the center-plane of the two radiation patterns will detect and measure equal amplitudes of radiation of each frequency. If the detector is moved away from the center-plane, greater amplitude of one frequency and less amplitude of the other frequency will be detected. Upon further movement of the detector away from the center-plane, the amplitude of one frequency of radiation will become zero. The detection system need only measure the relative amplitude rather than absolute values of intensity. The foregoing information may be utilized to indicate the relative position of the detector or receiver with respect to the center-plane. In the case of aircraft, it has been noted that two such center-planes would be formed. In this case there will be four characteristic frequencies involved, two for each center-plane.

The accuracy of the nuclear instrument landing system disclosed herein is determined by the accuracy associated with the definition of nuclear beam and the accuracy of the nuclear beam detection. As to the definition of the nuclear radiation beams or center-plane, this is a function of the geometry used in the source-shutter assembly design. Using a cobalt-60 radiation source and an 8 inch diameter shutter will provide a definition in the order of ± 1 foot at the range of 200 feet. The accuracy of the nuclear beam detection is primarily a function of the count rate received by the detector which determines the signal to noise ratio between the individual frequencies used for formation of the radiation beams. The accuracy, therefore, will tend to increase sharply as the aircraft approaches closer to the source because the count rate will increase, and also because the definition of the individual frequencies will become better. Thus, the system inherently provides the highest accuracy near touch down just when the highest accuracy is needed.

The radiation from the radioactive source is not a hazard to the personnel. By way of example, the glide slop beam and localizer beam may be generated by two radioisotope sources of 10 curies each of cobalt-60. If an approaching aircraft is at an average distance of 200 feet away from the radioactive source and if the aircraft spends an average of one minute making the final decent and landing, the radiation dose received by the personnel in the airplane will be in the order of magnitude less than 0.25 milliroentgen per landing. The radiation beam may be shielded so as not to expose personnel in the terminal area to unnecessary radiation. A shield constructed of lead 10 inches thick will reduce the radiation from the 10 curie cobalt-60 source to a level equivalent to 0.1 millicuries of cobalt-60.

Figure 5:
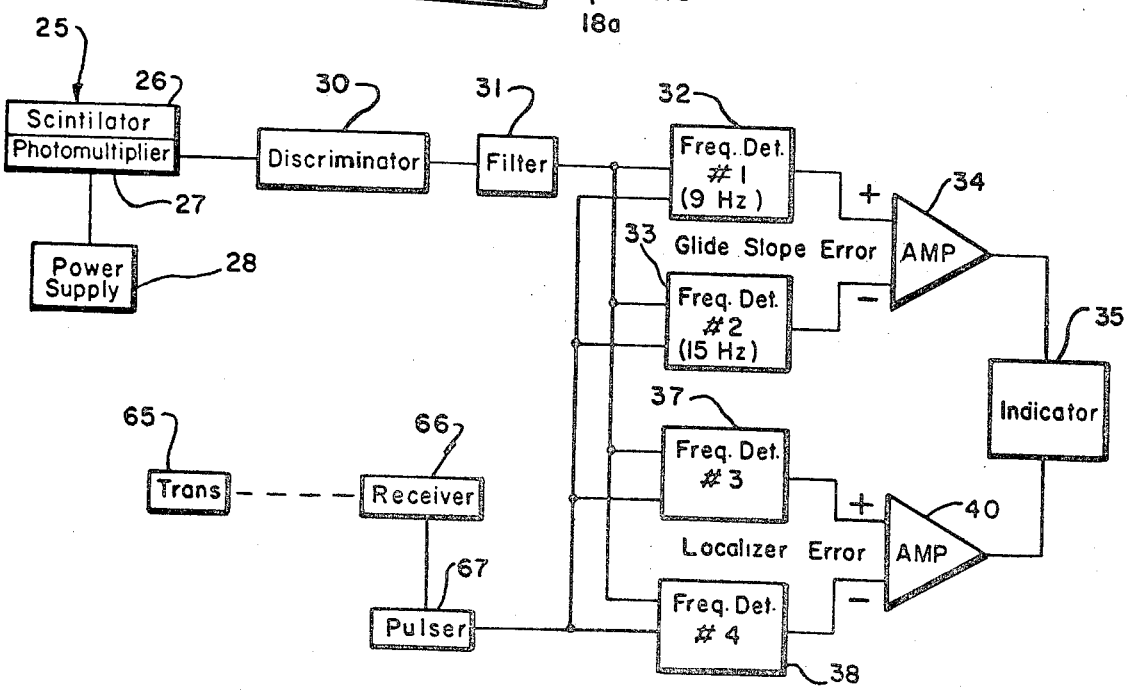
FIG. 5 is a schematic diagram of a receiver for radiation sensing and position indicating suitable for use in association with the object whose position is to be determined.

The modulated radiation patterns as heretofore described may be suitably detected and the position of a radiation detector determined with respect to the center-plane of any two radiation patterns. A suitable detection circuit is shown in FIG. 5. A detector 25 senses the presence of radiation of the type emitted by the radiation generator. The detector 25 may consist of a scintilator 26, a photomultiplier tube 27. A high voltage power supply 28 is provided to power the photomultiplier tube. If the detector 25 is placed within the radiation patterns of FIG. 2, the detector 25 may sense either of two characteristic frequencies of radiation or a combination thereof. If the detector 25 senses a combination of the two radiation patterns and the relative amplitudes thereof are the same, the detector 25 is then located in the center-plane 23. As has been explained, the radiation center-plane 23 of FIG. 2 may serve as either the glide slope beam or localizer beam of a landing system. A similarly generated center-plane of radiation may be generated to form the other of the guidance beams in a landing system. In such a case, the detector 25 of FIG. 4 may sense any one of four modulated radiation patterns or any combination thereof.

In further reference to FIG. 5, the electrical output signal from the detector 25 is impressed upon various signal processing circuits including a discriminator circuit 30 which serves to distinguish the signal radiation from background noise. The output of discriminator 30 is impressed upon a filter circuit 31 wherein undesired frequencies are attenuated. The filter output is then impressed upon at least a pair of frequency detection circuits 32, 33 each of which is designed to recognize a signal frequency associated with one of the radiation patterns. As heretofore indicated, typical frequencies might be 9 and 15H. The pair of frequency detectors 32, 33 are each designed to provide a direct current output representative of the detected frequencies. These outputs are then summed by an operational amplifier 34 the output of which is impressed upon an indicator 35. The indicator 35 may be in the form of a galvanometer or other instrument which conveys information to an operator. The indicator 35 is calibrated to indicate the relative amplitudes of the two signals provided by the frequency detection circuits 32, 33 which in turn are representative of the relative amplitude of the modulated radiation patterns sensed by detector 25. For example, if the detector 25 is placed in the radiation pattern of FIG. 2, the relative amplitude of the radiation patterns 20, 21 depends upon the position of detector 26 with respect to the center plane 23. If center-plane 23 of FIG. 2 is representative of the glide slope of FIG. 1, then the indicator 35 of FIG. 5 will provide a reading representative of that position.

As previously described, the center-plane 23 of FIG. 2 may be appropriately orientated to serve as the localizer beam 13 of FIG. 1. The circuit of FIG. 5 may be appropriately modified to sense the two additional radiation patterns associated with the localizer beam each of which is modulated at a characteristic frequency. The modification of the circuit in FIG. 5 would include the addition of a second pair of frequency detection circuits 37, 38 the outputs of which are impressed upon a second operational amplifier 40. The operational amplifier 40 adds the signal outputs of the frequency detection circuits 37, 38 to provide an output signal which is representative of the position of detector 25 with respect to the localizer beam. This amplifier output signal is impressed upon indicator 35 wherein the information is conveyed to an operator in a convenient form. The operational amplifier outputs may be simply used to form audial tones the amplitudes of which are compared by an operator.

The detection sensitivity and the range of the landing system may be enhanced by adding phase-lock features to the system. The shutters 17, 18 of FIG. 4 may be designed and arranged to simultaneously interrupt both of the radiation patterns 20, 21 of FIG. 2 thereby defining a portion in each cycle of revolution of the shutters during which no radiation is emitted. During this blank portion of the cycle, a signal representative thereof may be used to excite the detection circuit thereby coordinating the phase of the modulated radiation patterns and the frequency detection circuits of FIG. 5. Thus, in FIG. 5, a reference signal transmitter 65 provides a reference signal to a reference signal receiver 66 which impresses the reference signal upon a pulser circuit 67. The latter has an output signal which is impressed upon each of the frequency detector circuits 32, 33, 37, 38 for the purpose of initiating a low amplitude excitation reference pulse therein. In this manner, the frequency detection circuits each oscillate at their tuned frequency, i.e., at the frequency to be detected and are in phase with the signal representative of the radiation. Thus, a very weak radiation signal will be detectable since the signal to be detected will be added to the reference pulse.

Figure 6:
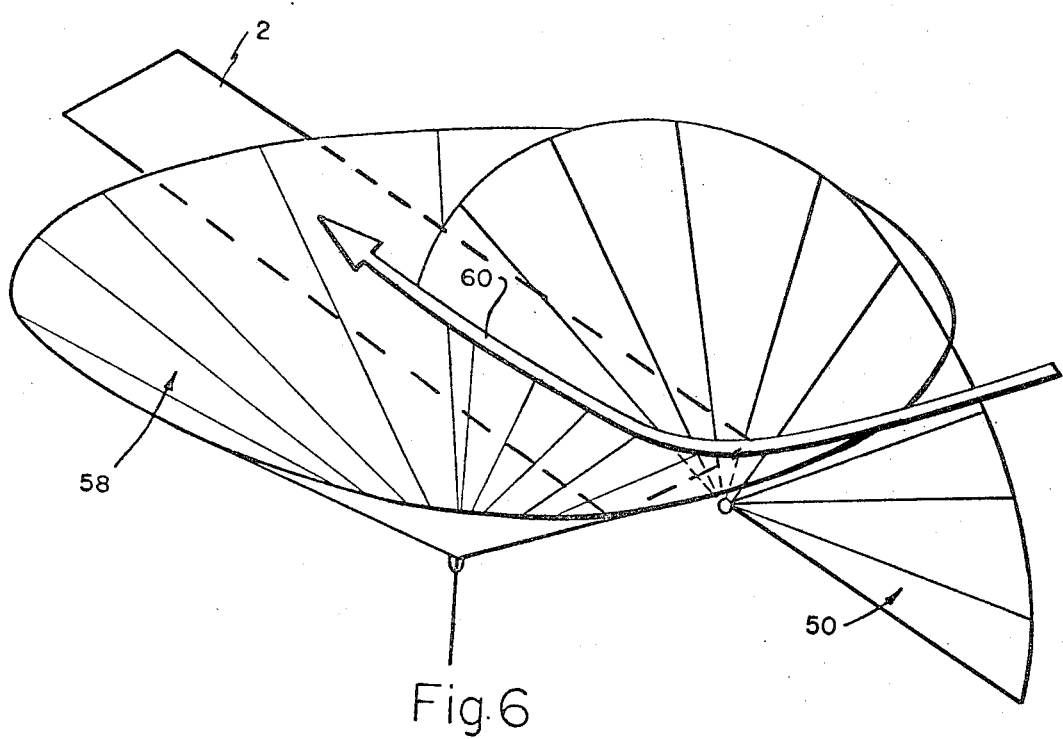
FIG. 6 is a diagrammatic representation of another example of the position sensing system constructed in accordance with the principles of the present invention wherein a curved flight path is defined.
Figure 7:
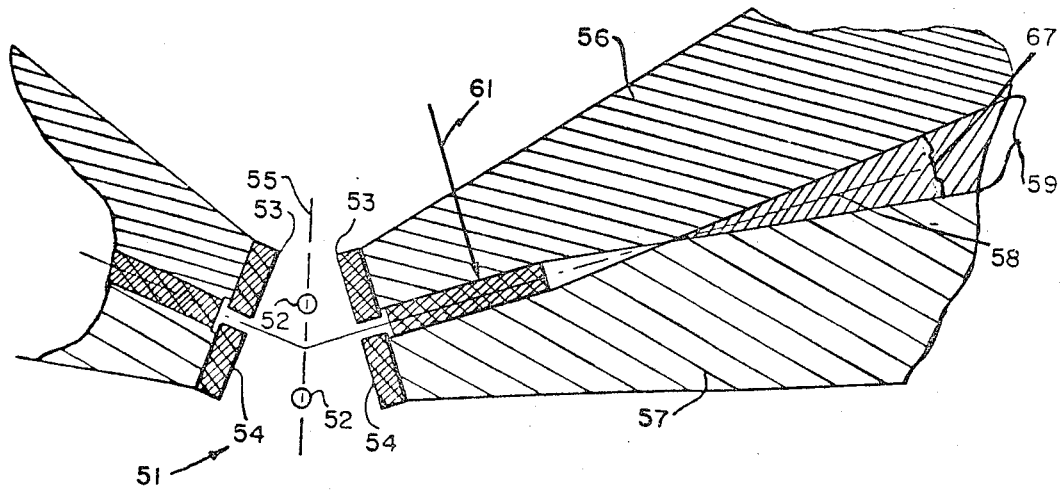
FIG. 7 is a diagram of a beacon shutter device used in forming the conical beam of FIG. 6 and further including a radiation absorber for shaping the radiation patterns.

Other embodiments of the invention described herein may be used to provide flight paths which are curved such as might be desirable for flare before touchdown or flight paths for short takeoff and landing aircraft. Such an embodiment is shown in FIGS. 6 and 7 wherein a localizer beam 50 is formed by a vertical center-plane of radiation modulated at two frequencies just as was the localizer beam heretofore described. The glide slope beam however is formed in the shape of a cone by making a conical shutter assembly or beacon illustrated in FIG. 7 which serves the same purpose as did the shutter assembly of FIG. 4.

The apparatus includes a double shutter assembly similar to that of FIG. 2. As diagrammed in FIG. 7, each of a pair of shutters is a substantially torroidal element which revolves about an axis of rotation 55 and has a number of slots through which radiation may pass. The assembly includes a housing with an opening therein whereby the torroidal element may be rotated to periodically register the slots with the opening in the housing thereby defining a shutter system. An upper shutter is simply depicted at 53 and a lower shutter at 54.

As heretofore explained, one or more radiation sources 52 emit radiation which when periodically interrupted by the shutters define a first and second radiation pattern 56, 57 which intersect to form a sensitive zone 59 in which a center-plane 58 of equal intensity radiation exists.

Other variations in the shape of the radiation beams or patterns may be provided by the use of a radiation absorber, such as a lead shield, placed radially from the radiation source and between the intersecting patterns of radiation. Such an arrangement is shown in FIGS. 7 and 8 which may be used to provide the aircraft approach path shown in FIG. 9.

Referring to FIG. 7, an absorber 61 is positioned as shown and serves to selectively modify the overlapping characteristics of the radiation patterns 56, 57. The beacon apparatus of FIG. 7 is shown in FIG. 8 in conjunction with a selectively shaped radiation absorber 61'. The radiation from source 52' is periodically emitted through a shutter assembly, depicted at 53' to form a modulated pattern of radiation on one side of absorber 61'. Radiation emitted through the other shutters depicted at 54', forms the second modulated radiation pattern which intersects the first pattern to define an overlapping sensitive area as heretofore described. Within the sensitive area is the center-plane or zone of equal intensity radiation which may be used as a reference for determining position of an object with respect thereto.

Figure 8:
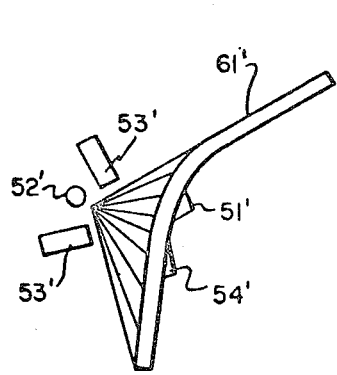
FIG. 8 is a diagrammatic representation of the radiation beacon of FIG. 7 adapted to generate a particular flight path.
Figure 9:
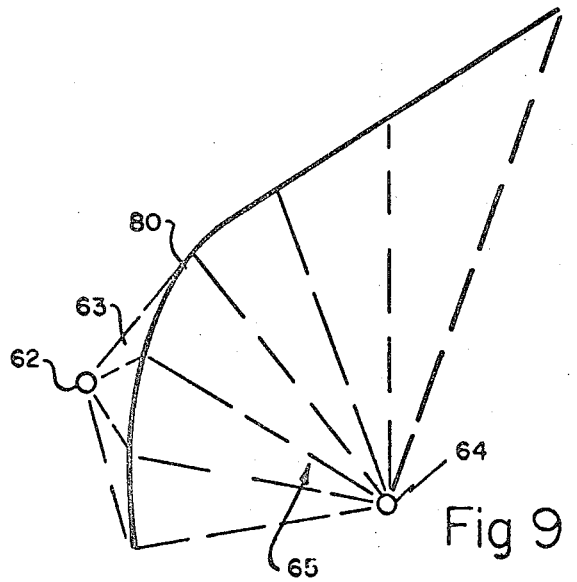
FIG. 9 is a representation of a flight path generated in part by the beacon of FIG. 8.

The beacon apparatus of FIG. 8 is represented in FIG. 9 by the numeral 62 and is shown as generating a curved reference zone or center-plane 63 which conforms substantially to the shape of the absorber 61' of FIG. 8. A second beacon 64, similar to the apparatus of FIG. 8, forms another reference zone of radiation 65 which intersects the curved reference zone of radiation 63 thereby defining a curved line 66 in space which may serve as a flight path for aircraft. Such a curved flight path is particularly suited to helicopter and STOL type aircraft.

The use of an absorber material to selectively shape the radiation patterns is particularly suited to the guidance of high speed aircraft. The apparatus used to generate a glide slope is typically installed along side of the landing strip. If the apparatus of FIG. 2 is used to generate a glide slope, the axis of radiation of the shutters would be oriented vertically which means that the portion of the glide slope near the landing strip would be created by angularly sweeping radiation patterns. It is feasible that the landing speed of an aircraft might approach the sweep of the radiation patterns os as to place the aircraft in a zone which is continuously absent of radiation or at least to create a situation in which a doppler effect would make signal recognition impractical, thus, the aircraft would have no position determining capability. This condition may be avoided by substantially aligning the axis of rotation of the shutters with the flight path of the aircraft.

The invention described herein may be used in yet another manner which provides a substantially constant size flight path corridor. The state of the art ILS and the landing system described herein in conjunction with FIG. 2 provide a sensitive area 22 which becomes narrower as the aircraft approaches touchdown, thus, it becomes increasingly difficult for the pilot to maintain the aircraft within the sensitive area or flight corridor.

A constant size corridor may be generated in accordance with the principles of the invention herein. Reference is made to FIG. 7 wherein it may be noted that the included angle within the sensitive area 59 may be varied by changing the radial dimension of radiation absorber 61. Thus, if a particular length is selected for a cord of a circle which traverses the sensitive area 59, the radial location of the cord of the selected length will vary as a function of the absorber size. For example, the cord dimension 67 will be located nearer the radiation source 52 if the absorber 61 is removed because the included angle of the sensitive area 59 will be larger.

Figure 10:
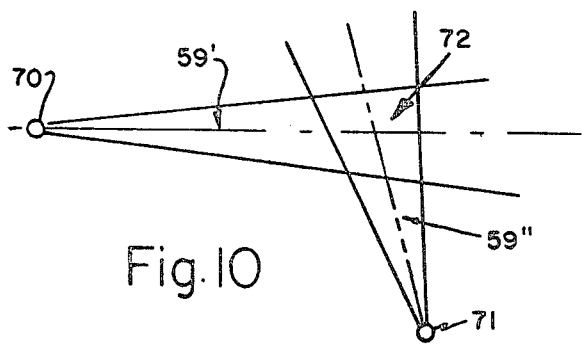
FIG. 10 is a representation of two radiation beams used to define a constant cross-section flight corridor.
Figure 11:
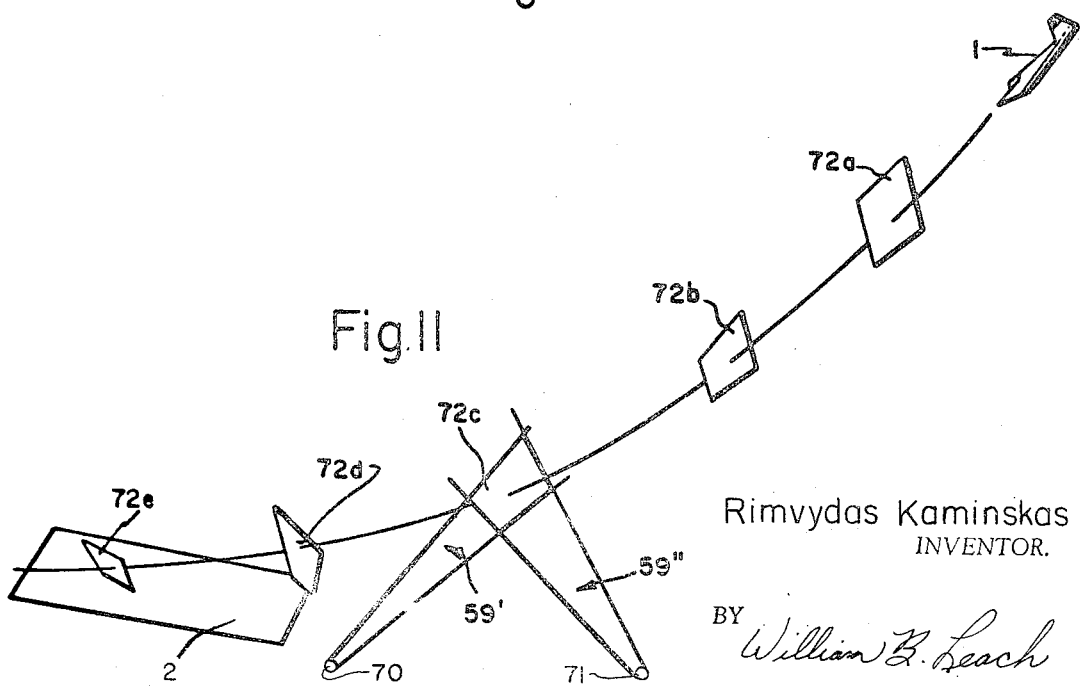
FIG. 11 depicts a constant cross-section flight corridor formed as in FIG. 10.

These observations are used in FIG. 10 wherein one radiation beacon 70 generates a first sensitive area 59' and another radiation beacon 71 generates a second sensitive area 59''. The intersection of the two sensitive areas 59', 59'' define a flight corridor 72 having dimensions which are a function of the included angle of the sensitive areas and the radial distance from the sources. These factors may be controlled by proper selection of the radiation absorber configuration. This technique is shown in FIG. 11 wherein the beacons 70, 71 generate intersecting sensitive areas 59', 59'' to define a corridor depicted in two dimensional segments 72a – 72e. An aircraft 1 ascertains its position with respect to the corridor as heretofore described.

If the radiation intensity is varied transversely throughout the patterns, as was the case with the radiation patterns with FIG. 2, a conical center-plane 58 will be formed which may be used as a reference for determining the position of a radiation detector with respect thereto.

The conical radiation center-plane 58 of FIG. 7 is also shown in FIG. 6 wherein it serves as a glide slope beam and is directed and positioned so as to intersect the vertically orientated localizer beam 50. The intersection of the two beams 50, 58 form a parabolic line in space 60 which may serve as the flight path to be followed by an approaching aircraft.

What is claimed is:

1. A radiation generator for housing a source of radiation therein and for forming a pattern of radiation, comprising:
   a. shielding means for permitting the escape of radiation in preselected directions;
   b. first shutter means operably associated with said shielding means for periodically interrupting a portion of the escaping radiation at a first preselected frequency; and
   c. second shutter means operably associated with said shielding means for periodically interrupting another portion of the escaping radiation at a second preselected frequency, said shielding means being dimensioned to direct said one and said other portions of radiation into an overlapping relationship.

2. The radiation generator of claim 1 wherein each said shutter means comprises a substantially clyindrical member designed to have a source of radiation positioned therein and having open radial sections through which radiation may escape, said cylinder member being positioned to permit each open radial sector to periodically register with the escaping radiation when said cylinder is revolved.

3. The radiation generation of claim 2 wherein said generator is orientated to vertically align the axis of said cylindrical member whereby the angular sweep of the emitted radiation pattern will be horizontal.

4. The radiation generator of claim 2 further comprising means for rotating said cylindrical member at a predetermined angular speed thereby providing a predetermined frequency of radiation emission.

5. The radiation generation of claim 1 further comprising a radiation absorber positioned external said shutter means and so located as to interrupt a portion of emitted radiation, said radiation absorber being selectively shaped so as to impart a preselected configuration of radiation.

6. A radiation generator comprising:
   a. a source of short wavelength radiation;
   b. shielding means associated with said radiation source for permitting the escape of radiation in preselected directions;
   c. shutter means operably connected to said shielding means for periodically interrupting one portion of the escaping radiation at one characteristic frequency to define a first radiation pattern and for interrupting another portion of the escaping radiation at another characteristic frequency to define a second radiation pattern.

7. The radiation generator of claim 6 wherein said source of radiation is an elongated source having a sufficient length to enable a portion of the radiation which forms said first radiation pattern to overlap that which forms said second radiation pattern.

8. The radiation generator of claim 6 wherein said source of radiation is a gamma emitter.

9. The radiation generator of claim 6 further comprising a radiation absorber positioned external said shutter means and so located as to interrupt a portion of emitted radiation, said radiation absorber being selectively shaped so as to impart a preselected configuration of radiation.

* * * * *